May 8, 1962  M. W. ANDREW  3,033,348
POULTRY HOUSE DROPPING PIT CLEANER
Filed July 14, 1958
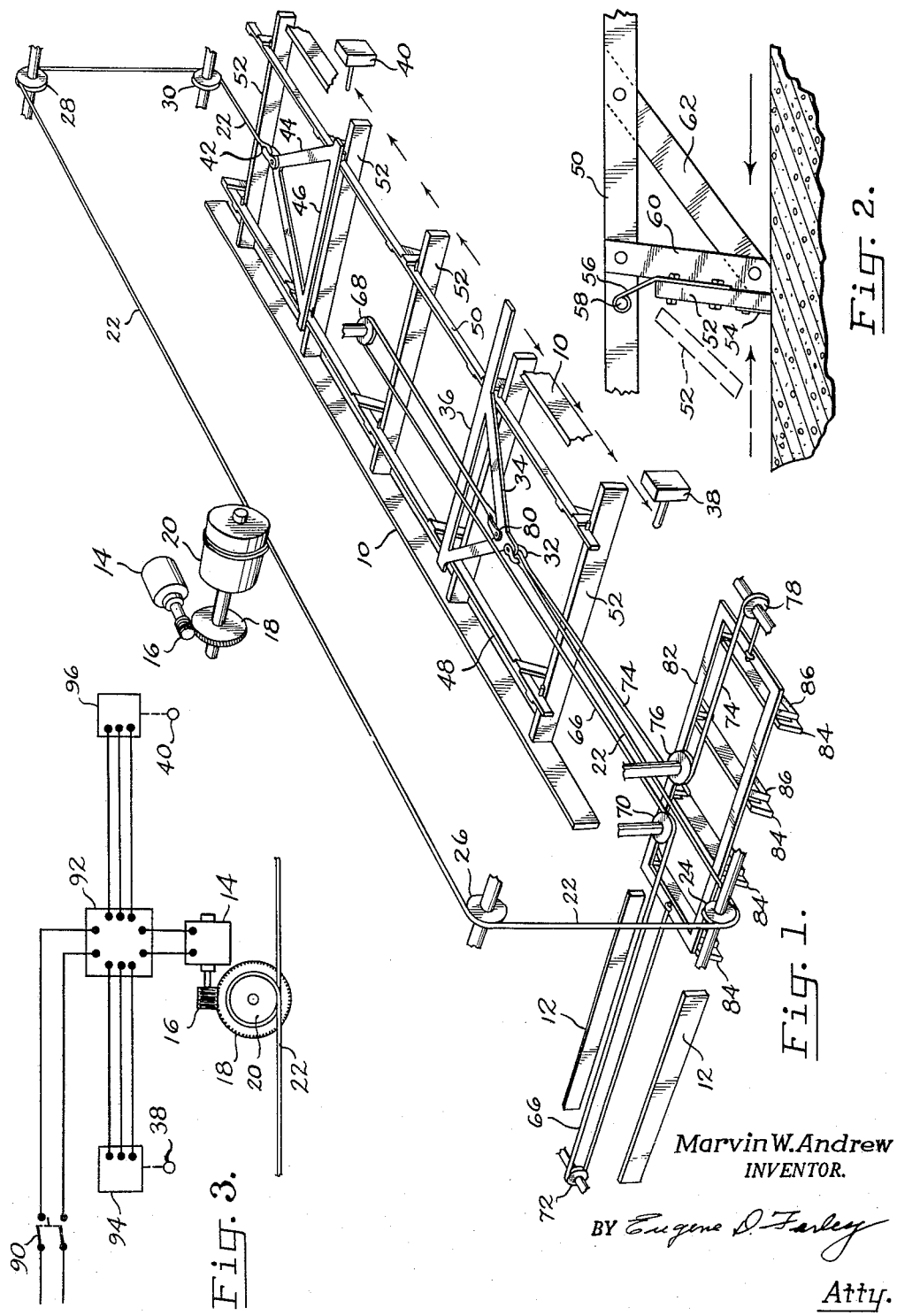
Marvin W. Andrew
INVENTOR.
BY Eugene D. Farley
Atty.

United States Patent Office 3,033,348
Patented May 8, 1962

3,033,348
POULTRY HOUSE DROPPING PIT CLEANER
Marvin W. Andrew, Rte. 1, Box 183, Orchards, Wash.
Filed July 14, 1958, Ser. No. 748,453
2 Claims. (Cl. 198—82)

This invention relates to apparatus for cleaning poultry house dropping pits.

It is the general object of the present invention to provide an efficient, inexpensive, automatic device for cleaning the dropping pits of either roost-type or cage-type poultry houses.

In the drawings:

FIG. 1 is a perspective view of the herein described dropping pit cleaner;

FIG. 2 is a detail view in side elevation illustrating one of the cleaning units of the pit cleaner of FIG. 1; and FIG. 3 is a schematic diagram illustrating the driving and controlling mechanism for the apparatus of FIGS. 1 and 2.

Generally stated, the poultry house dropping pit cleaner of my invention comprises a first scraper assembly positioned to scrape the pit, a second scraper assembly positioned to receive the scrapings delivered by the first scraper assembly and arranged at an angle thereto, and drive means connected to both scraper assemblies for reciprocating them synchronously with each other.

Considering the foregoing in greater detail:

As has been indicated above, the herein described cleaner is designed for use in a poultry house pit determined by side walls 10, which may be formed as a recess in the floor of the house beneath the poultry roosts or cages. It communicates with a laterally extending pit defined by side walls 12 and leading to the exterior of the house.

The cleaner is driven by a reversible motor 14 which preferably is a reversible electric motor. It is connected through gears 16, 18 to the shaft of a friction sheave 20. A flexible driving member such as cable 22 is reeved about sheave 20 and engages longitudinally spaced idler pulleys 24, 26, 28, 30.

The leading end of cable 22 is provided with an eye received by a clevis 32 which is pin-connected to a spreader bar 34 fastened to a cross arm 36. The latter is of sufficient length to extend laterally above and beyond side wall 10 so that it is in a position to contact limit switches 38, 40.

The rearward end of cable 22 is formed with an eye received by a clevis 42 which is pin-connected to a spreader bar 44. The latter in turn is connected to a cross bar 46 which, however, does not have the lateral extension carried by forward cross bar 36.

Spreader bars 34, 44 and cross bars 36, 46 comprise together with side rails 48, 50 the frame of a scraper assembly having for its function scraping the refuse material from the pit defined by side walls 10.

To this end, there are hingedly mounted between the side rails a plurality of longitudinally spaced, laterally extending, parallel scrapers 52. These members are of sufficient width to extend substantially from side wall to side wall. Their leading lower edges are provided with wear plates 54. An angularly bent hinge plate 56, the upper end of which is formed with an eye, is bolted to each scraper and pivotally attached by means of a pin 58 to the adjacent side rail.

Abutment means are provided behind each scraper to maintain it rigid in a substantially vertical position during the forward movement of the assembly. Such means comprises a bar 60 fixed to the side rails at substantially right angles thereto and backing up the scraper. A brace 62 lends rigidity to the assembly.

A second scraper assembly works in the lateral off-bearing pit defined by side walls 12. This assembly is driven from reversible motor 14 through a cable and pulley drive. The drive includes a first cable 66 engaging spaced idler pulleys 68, 70, 72 and a second cable 74 engaging spaced idler pulleys 76, 78. One end of cable 66 is formed with an eye which is received by a clevis 80 pin-connected to the back of spreader bar 34 directly opposite clevis 32. The other end of cable 66 is connected to the frame 82 of the secondary scraper assembly. One end of cable 74 is received by clevis 32 which also carries one end of cable 22. The other end of cable 74 is fastened to the rear end of frame 82.

Frame 82, like the frame of the primary scraper assembly, supports a plurality of longitudinally spaced, parallel, scraper bars 84 which may be hinged to the frame in the same manner that scraper bars 52 are hinged to their supporting frame. Also, scraper bars 84 are backed up by braced abutments 86 so that they are maintained vertically during their forward motion but may pivot angularly during their retraction.

The driving unit and its controls are illustrated schematically in FIG. 3. It includes reversible motor 14 which is in an electric circuit with house line switch 90, timer 92 and reversing switches 94, 96.

Operation

The operation of the presently described apparatus is as follows:

Upon closing switch 90 a timed cycle is initiated wherein reversing motor 14 is operated at time intervals calculated to keep the pit free of refuse and in a sanitary condition. When the motor is energized, it drives the primary scraper assembly carrying blades 52 forwardly by means of cable 22. At the same time, movement of the frame of the primary scraper assembly drives forwardly the secondary scraper assembly including scrapers 84 by means of cables 66, 74. The frame carrying scrapers 52 move forwardly until the extension on cross arm 36 contacts limit switch 38. This reverses motor 14 and thereupon the two scraper assemblies are retracted until the extension on arm 36 contacts switch 40, again reversing the motor. Thus the two scraper assemblies move synchronously with each other over travel paths such that the travel path of each scraper overlaps by a small amount the travel path of the adjacent scraper.

Also, the longitudinal travel path of scrapers 52 overlaps slightly the lateral travel path of scrapers 84. Hence as the two scraper assemblies reach their extended positions simultaneously with each other, the primary assembly advances its burden into off bearing pit 12 while the secondary assembly moves its burden to the exterior of the building. The blades of both assemblies then move backwardly to retracted positions, ready for another forward stroke.

Forward operation of the scrapers exerts an effective cleaning action since they are pressed downwardly by the action of their supporting frames and since they are maintained stiff and rigid in operative position by abutments 60. However, during their retracting motion, the hinged connections to their respective frames enable them to move angularly and to elevate in the manner indicated in dotted outline.

The reciprocating sequence is continued until the pit is entirely clean and the refuse removed by the off bearing scraper. Timer 92 then automatically shuts off motor 14 and the assembly remains at rest until a predetermined time has elapsed.

Thus it will be apparent that by the present invention I have provided apparatus for cleaning poultry house dropping pits effectively, efficiently and automatically. This has obvious advantages in maintaining the poultry house in a clean and sanitary condition, maintaining the poultry in good health, and materially reducing the labor costs involved in raising the poultry.

It is to be understood that the form of my invention, herewith shown and described, is to be taken as a preferred example of the same, and that various changes in the shape, size and arrangement of parts may be resorted to, without departing from the spirit of my invention, or the scope of the subjoined claims.

Having thus described my invention, I claim:

1. A poultry house dropping pit cleaner comprising a first scraper assembly movable between retracted and forward positions for scraping the bottom wall of a pit; a second scraper assembly disposed at an angle to the first scraper at one end thereof and movable between a retracted position in the path of the first scraper and a forward position to receive and carry away the scrapings delivered by the first scraper assembly; each of the scraper assemblies comprising longitudinal frame members, rigid depending bars secured to the longitudinal frame members at spaced intervals, and pivotal scraper blades arranged for supporting abutment against the depending bars in a scraping movement; reversible power drive means; a first flexible link connected to the drive means having its terminal ends connected to opposite ends of the first scraper for moving the latter between retracted and forward positions; a second flexible link connected between the first and second scraper assemblies in an arrangement to move the second scraper to its forward position simultaneously with the first scraper whereby in the forward position of the scrapers the second scraper is moved out of the path of travel of the first scraper; a third flexible link connected between the first and second scraper assemblies and arranged to move the second scraper to its retracted position simultaneously with the first scraper; and pulley means associated with the flexible links for accomplishing said movements.

2. The poultry house dropping pit cleaner of claim 1 wherein the power drive means comprises a reversible electric motor operative in an electric circuit, limit switch means in the electric circuit adjacent one of the scraper assemblies, and a switch actuating arm on the last mentioned scraper assembly arranged for engagement with the limit switch means for operating the drive means in opposite directions.

References Cited in the file of this patent

UNITED STATES PATENTS

| | | |
|---|---|---|
| 2,043,595 | Raymond | June 9, 1936 |
| 2,491,245 | Bergman | Dec. 13, 1949 |
| 2,552,743 | Simpson | May 15, 1951 |
| 2,681,132 | Knutson | June 15, 1954 |
| 2,751,061 | Nickerson | June 19, 1956 |
| 2,752,029 | Hammond | June 26, 1956 |